(12) United States Patent
Heppe

(10) Patent No.: US 10,457,394 B2
(45) Date of Patent: *Oct. 29, 2019

(54) AIRSHIP LAUNCH FROM A CARGO AIRSHIP

(71) Applicant: STRATOSPHERIC AIRSHIPS, LLC, Hood River, OR (US)

(72) Inventor: Stephen B. Heppe, Hood River, OR (US)

(73) Assignee: STRATOSPHERIC AIRSHIPS, LLC, Hood River, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/581,681

(22) Filed: Apr. 28, 2017

(65) Prior Publication Data

US 2017/0225785 A1 Aug. 10, 2017

Related U.S. Application Data

(60) Division of application No. 14/506,134, filed on Oct. 3, 2014, now Pat. No. 9,669,917, which is a continuation-in-part of application No. 13/347,371, filed on Jan. 10, 2012, now Pat. No. 9,522,733, which is a continuation-in-part of application No.
(Continued)

(51) Int. Cl.
| | |
|---|---|
| *B64D 5/00* | (2006.01) |
| *B64B 1/06* | (2006.01) |
| *B64B 1/62* | (2006.01) |
| *B64B 1/50* | (2006.01) |
| *B64B 1/64* | (2006.01) |
| *B64B 1/40* | (2006.01) |

(52) U.S. Cl.
CPC ............... *B64D 5/00* (2013.01); *B64B 1/06* (2013.01); *B64B 1/50* (2013.01); *B64B 1/62* (2013.01); *B64B 1/64* (2013.01); *B64B 1/40* (2013.01)

(58) Field of Classification Search
CPC .... B64B 1/06; B64B 1/40; B64B 1/58; B64B 1/62; B64B 1/64; B64D 5/00
See application file for complete search history.

(56) References Cited

U.S. PATENT DOCUMENTS

| | | | |
|---|---|---|---|
| 1,549,061 | A | 5/1923 | Chenu |
| 1,372,924 | A | 3/1929 | Anderson |

(Continued)

FOREIGN PATENT DOCUMENTS

| | | |
|---|---|---|
| DE | 3737233 A1 | 5/1989 |
| GB | 2141088 A | 12/1984 |
| WO | 2005081680 A2 | 9/2005 |

OTHER PUBLICATIONS

Woolard; The Mitre Digest; 12 Miles High; An Integrated Airship-Radar is on the Horizon, Mar. 19, 2010.
(Continued)

*Primary Examiner* — Magdalena Topolski
(74) *Attorney, Agent, or Firm* — Riddle IP, PLLC; Jeffrey K. Riddle

(57) ABSTRACT

A method for launch of an airship includes connecting a cargo airship to a second airship that is not positively buoyant at the launch site, launching the cargo airship, transferring lifting gas from the cargo airship to the second airship where said lifting gas is carded by the cargo airship while aloft; and releasing the second airship from the cargo airship. A high-altitude airship launch system is also provided.

17 Claims, 10 Drawing Sheets

Related U.S. Application Data

13/159,215, filed on Jun. 13, 2011, now Pat. No. 8,864,063.

(56) References Cited

U.S. PATENT DOCUMENTS

| | | | |
|---|---|---|---|
| 1,818,138 A | | 8/1931 | Howland |
| 2,758,804 A | | 8/1956 | Hakomaki |
| 2,863,618 A | | 12/1958 | Doyle et al. |
| 3,185,411 A | * | 5/1965 | Gembe .................. B64B 1/00 |
| | | | 244/30 |
| 4,082,063 A | | 4/1978 | Strickland |
| 4,497,272 A | | 2/1985 | Veazey |
| 4,995,572 A | | 2/1991 | Piasecki |
| 5,333,817 A | | 8/1994 | Kalisz |
| 5,857,645 A | | 1/1999 | Hodgson |
| 6,220,543 B1 | | 4/2001 | Uskolovsky |
| 6,422,506 B1 | | 7/2002 | Colby |
| 6,575,403 B1 | | 6/2003 | Monroe |
| 6,824,098 B1 | | 11/2004 | Belloso |
| 6,837,463 B2 | | 1/2005 | Lynn |
| 7,055,777 B2 | | 6/2006 | Colting |
| 7,082,063 B2 | | 7/2006 | Yahata et al. |
| 7,341,224 B1 | | 3/2008 | Osann |
| 7,708,222 B2 | | 5/2010 | Lee |
| 8,006,933 B2 | | 8/2011 | Tillotson |
| 8,061,648 B2 | | 11/2011 | Lachenmeier |
| 2002/0175243 A1 | | 11/2002 | Black |
| 2004/0195431 A1 | | 10/2004 | Yumlu et al. |
| 2008/0179453 A1 | | 7/2008 | Thompson |
| 2009/0072078 A1 | * | 3/2009 | Choi .................. B64B 1/06 |
| | | | 244/30 |
| 2009/0108135 A1 | * | 4/2009 | Shaw .................. B64C 3/30 |
| | | | 244/158.3 |
| 2012/0234965 A1 | | 9/2012 | Heppe |
| 2017/0355462 A1 | * | 12/2017 | Hoheisel .................. B64D 1/12 |

OTHER PUBLICATIONS

Naval Research Advisory Committe, Lighter-Than-Air Systems for Future Naval Missions, Flag Officers and Senior Executive Service, The Pentagon Auditorium, Oct. 4, 2005.

Sanswire Corporation, Unmanned Airship Solutions for Integrated ISR Systems; Technical White Paper, Jul. 24, 2007; www.sansire.com.

Graham Warwick, Higher ground: Stratospheric airships special report; Aug. 15, 2006; Washington DC—Flight International; www.flightglobal.com.

Craig L. Nickol et al., High Altitude Long Endurance UAV Analysis of Alternatives and Technology Requirements Development, NASA/TP-2007-214861; Mar. 2007.

George D. Modica et al., An Investigation of Stratospheric Winds in Support of the High Altitude Airship, Atmospheric and Environmental Research, Inc., Lexington, Massachusetts Systems Technology, Inc., Hawthorne, California; Jan. 22, 2008.

JP Aerospace, Something new at the boundary of Earth and space; Tandem Class Airships, http://www.paerospace.com/Tandem/tandem.html[Nov. 20, 2010 4:50:26 PM].

Mitre, 12 Miles High; An Integrated Airship-Radar is on the Horizon, Mar. 15, 2010.

George D. Modica et al., An Investigation of Stratospheric Winds in Support of the High Altitude Airship, Atmospheric and Environmental Research, Inc., Lexington, Massachusetts Systems Technology, Inc., Hawthorne, California; Sep. 21, 2010.

Petrussa, Annette, "Airship", http://www.madehow.com/Volume-3/Airship.html.

Gazder, Ryan P., Pant, Rajkumar, S., "A Comparative Evaluation of Operation of Airships and Helicopters in Uttaranchal." Department of Aerospace Engineering, IIT Bombay, Powai, Mumbai 400076, p. 7.

Khoury, Gabriel, A., "Airship Technology." Second Edition. Cambridge. pp. 285-286.

* cited by examiner

AIRSHIP LAUNCH FROM A CARGO AIRSHIP

RELATED DOCUMENTS

The present application divisional and claims the benefit under 35 U.S.C. § 120 of U.S. patent application Ser. No. 14/506,134 filed Oct. 3, 2014 to Stephen Heppe, entitled "Airship Launch from a Cargo Airship" which is a continuation-in-part of U.S. application Ser. No. 13/347,371 filed Jan. 10, 2012 to Stephen Heppe, and entitled "Airship Launch from a Cargo Airship", which is a continuation-in-part of U.S. application Ser. No. 13/159,215 filed Jun. 13, 2011, now issued as U.S. Pat. No. 8,864,063 on Oct. 21, 2014, to Stephen B. Heppe, and entitled "Tethered Airships." These applications are herein incorporated by reference in their entireties.

BACKGROUND

High-altitude airships can be used as platforms for a variety of missions, including weather and astronomical observations. High-altitude airships are designed to be light-weight and hold large volumes of lifting gas to provide the desired amount of buoyancy in the upper atmosphere. A stratospheric balloon or airship is generally designed with a light-weight hull to contain lifting gas while minimizing overall airship mass. For example, airships intended for operation in the upper stratosphere may have a hull with a thickness that is less than 50 µm and an areal density less than 100 g/m² of effective hull surface area, with a surface area on the order of tens of thousands of square meters.

The large surface area and thin hull can make the airship vulnerable to damage, particularly during launch. To launch an airship, a suitable launch site is selected and a launch window is selected when little or no wind is anticipated. The launch method restricts the amount of slack balloon material that is subject to wind drag or "sail" effect during the launch. The launch site also includes a large open area where the balloon can be laid out and inflated without risk of the fragile hull coming into undesirable contact with external objects. Here, the bulk of the balloon is laid out lengthwise on a suitable launch surface. Very large balloons (20-40 million cubic feet displacement; 500,000 to 1,000,000 cubic meters displacement) can use 800 ft. (240 meters) or more of layout space. The top portion of the balloon is placed under a roller arm of a launch vehicle. This launch vehicle confines the lifting gas to the top portion of the balloon during inflation. At the completion of inflation, the launch arm is released and the balloon rises vertically over a payload release vehicle. This payload release vehicle includes a crane that suspends the payload. The payload release vehicle can be driven downwind to minimize the wind effects on the hull. Even with these precautions, these launch techniques can only be used in calm or near calm winds and still result in a significant risk of the hull and/or payloads being damaged. Further, these operational constraints severely limit the locations and times that a high-altitude balloon can be launched.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

The figures and specification below describe a two stage deployment concept that includes a robust low-altitude airship that can carry a high-altitude airship as a payload, and deploy it at a suitable altitude. The low-altitude airship can be launched (along with its cargo) from a convenient launch site and flown to a different site for the deployment and launch of the high-altitude airship. This enables direct insertion into difficult environments such as polar or mid-oceanic areas.

The robust low-altitude airship can be launched in a greater variety of wind conditions and a greater variety of launch sites (airports), as compared to a fragile high-altitude airship, thereby increasing launch opportunities and reducing certain transportation and logistics costs. Also, by deploying the high-altitude airship at a suitable altitude away from the ground while the low-altitude airship (which may also be called the cargo airship, first-stage airship, or other suitable name) is in drifting flight, airspeed and wind gusts are minimized, thereby easing the launch of the high-altitude airship and minimizing the potential for damage.

The concepts described herein represent a technological alternative to the special-purpose launch site and special-purpose support equipment and personnel used for the launch of high-altitude airships. Additionally, the balloon is handled less and risk of damage to the hull is considerably reduced.

Some or all of the expense of building and operating the low-altitude airship is offset by the avoided expenses associated with some special-purpose launch sites and special-purpose support equipment used for the launch of high-altitude airships. Also, because of the increased operational flexibility of the concepts described herein, costs of launching a high-altitude airship can be amortized over a greater number of launches.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples. In some cases, the components shown in the figures may not be drawn to scale. Further, the relative scale of the components in a given figure may be varied for purposes of illustration.

Figure 1A:
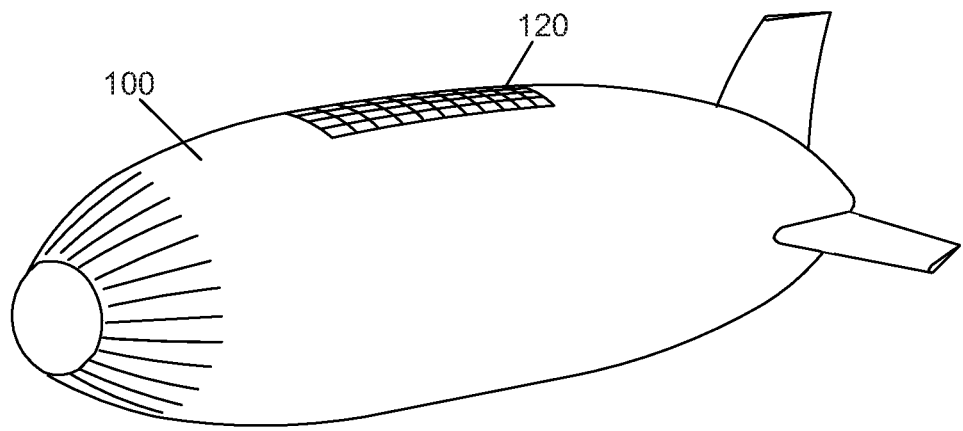
FIGS. 1A and 1B show cargo airships with payload doors that can be opened when launching a high-altitude airship, according to one example of principles described herein.

FIG. 1A illustrates the general outline of a cargo airship 100 equipped with a payload bay door or flap 120 on its upper surface. The cargo airship 100 could also be described as a "low-altitude airship", "first stage airship", "launch airship", "logistics tug", or other appellations. A payload bay, which is located inside the airship 100, contains a high-altitude airship intended to be launched using the inventive concept. The payload bay communicates with the outside environment via the payload bay door or flap 120. The cargo airship 100 comprises sufficient buoyant volume, separated from the payload bay, to carry itself and its payload to a desired deployment altitude. The cargo airship 100 may be manned, unmanned, or optionally manned. The cargo airship 100 may include other subsystems such as energy or fuel storage subsystems, propulsion subsystems, aerodynamic control subsystems (such as lifting surfaces and/or aerodynamic control surfaces), buoyancy control subsystems including releasable ballast, and communications, navigation, and control subsystems appropriate to the manning concept employed. The payload comprises the high-altitude airship intended to be launched, support hardware, and optionally, a source of lifting gas for the high-altitude airship such as e.g. tanks of compressed hydrogen or helium, or a reservoir of chemical stocks that can be used to generate hydrogen gas at will.

The terms "low-altitude" and "high-altitude", and their variants, are intended to indicate the relative intended (i.e., "design") operating altitudes of the two airships comprising elements of the inventive system. In many examples, the "low-altitude" airship is intended to operate in the troposphere or lower stratosphere, and the "high-altitude" airship is intended to operate at a substantially higher altitude than the "low-altitude" airship. In one example, the low-altitude airship is intended to operate in the lower stratosphere at an altitude of roughly 20 km, and the high-altitude airship is intended to operate within an altitude range of 25-40 km.

Figure 1B:
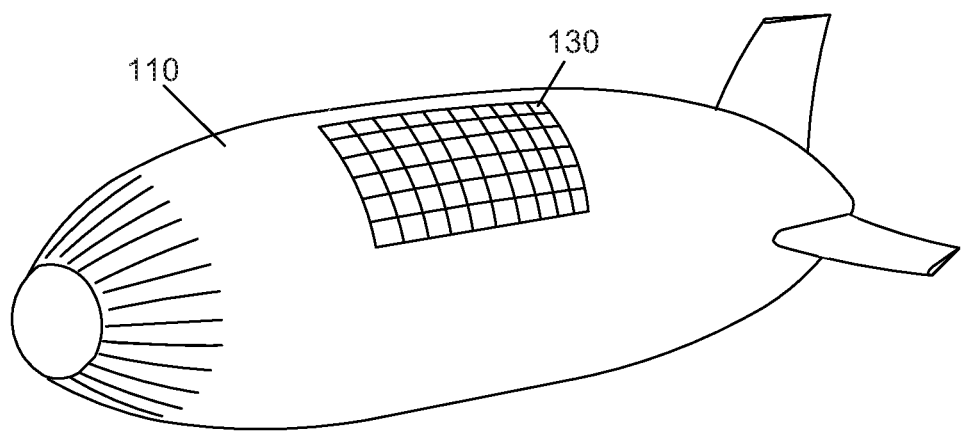

FIG. 1B illustrates the general outline of a cargo airship 110, similar in many respects to the cargo airship 100 previously illustrated, equipped with a payload bay door or flap 130 on its upper and lateral surface.

Figure 1C:
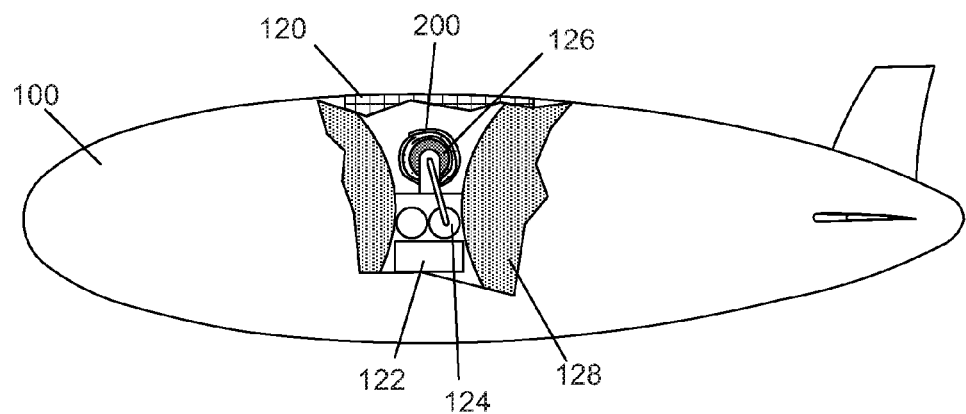
FIG. 1C is a side view of a cargo airship that has been partially cut away to show storage of a high-altitude airship and launching apparatus, according to one example of principles described herein.
Figure 1D:
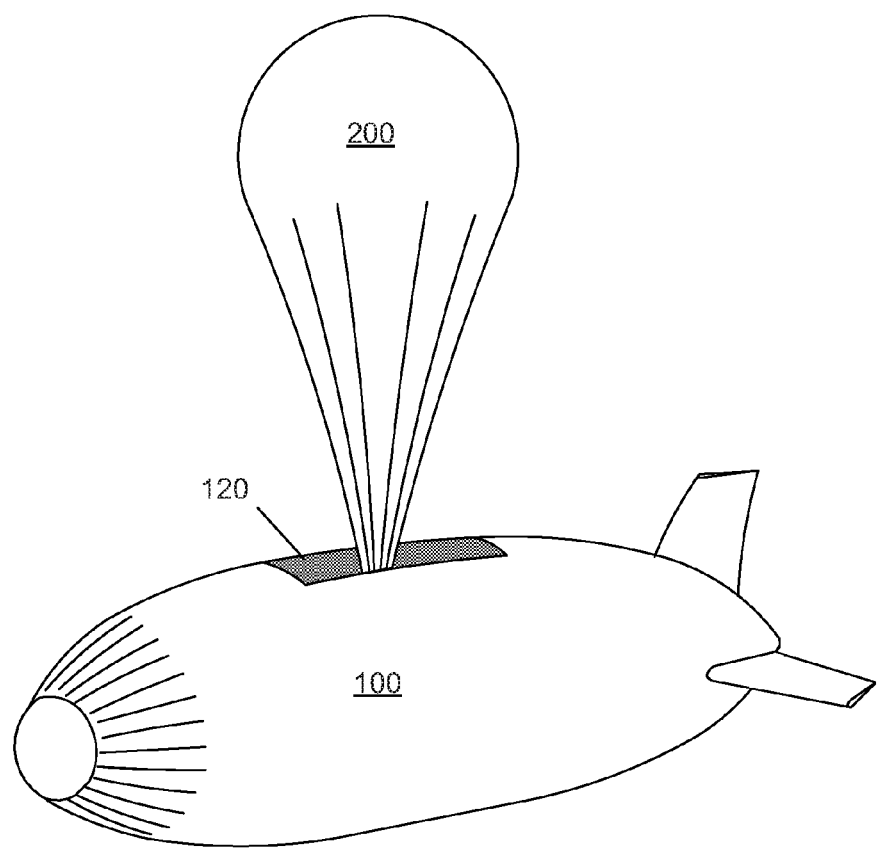
FIG. 1D shows a high-altitude airship being launched from a cargo airship, according to one example of principles described herein.
Figure 1E:
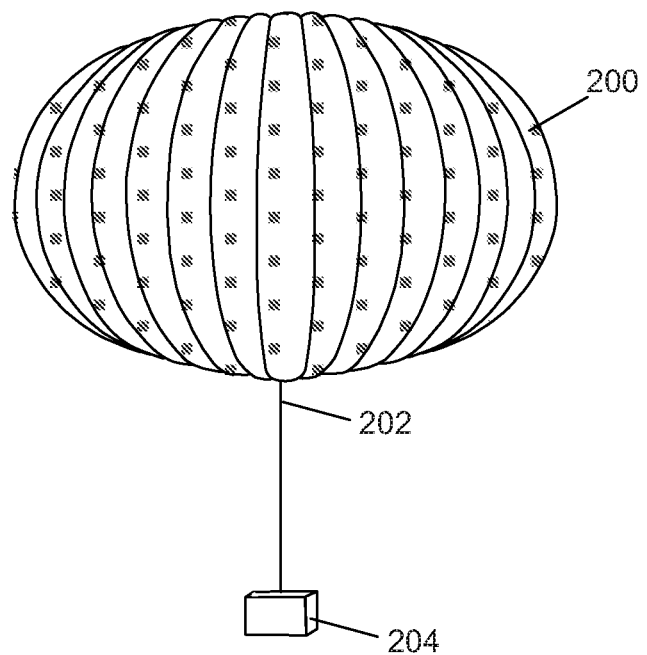
FIG. 1E is a side view of a high-altitude airship and payload at altitude, according to one example of principles described herein.

FIG. 1C is a side view of a cargo airship 100 that has been partially cut away to show storage of a high-altitude airship 200 and launching apparatus (122, 124, 126) in a payload bay. The cargo airship 100 includes a number of internal ballonets 128. The ballonets 128 provide containment of the lifting gas and allow for the distribution of lifting gas to be shifted to achieve more desirable flight characteristics. In this example, a space between the ballonets 128 may be used to store: the high-altitude airship 200 on a reel 126; supplies of lifting gas 124; as well other gear such as command and control equipment 122. The payload bay door 120 is opened to allow the high-altitude airship 200 to be deployed. As discussed below in greater detail, the hull or ballonets of the high-altitude airship can be inflated from the supplies of lifting gas 124 and/or from the lifting gas in the ballonets 128 of the cargo airship 100. The reel 126 rotates to allow the high-altitude airship 200 to be deployed upward through the payload bay door 120 of the cargo airship 100 as shown in FIG. 1D. FIG. 1E is a side view of a high-altitude airship 200 at altitude with an optional payload 204 suspended from the airship by shroud lines 202. In this implementation, the high-altitude airship 200 includes a "pumpkin lobed" hull balloon intended for operation in the upper stratosphere.

Figure 2A:
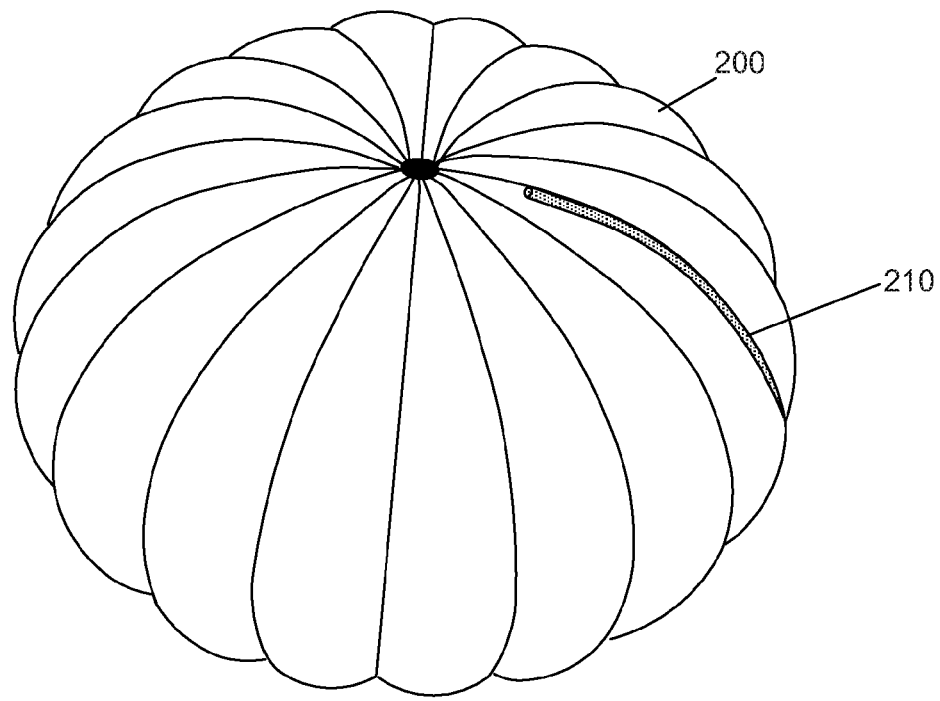
FIGS. 2A and 2B are diagrams showing high-altitude airship with an inflation tube, according to one example of principles described herein.
Figure 2B:
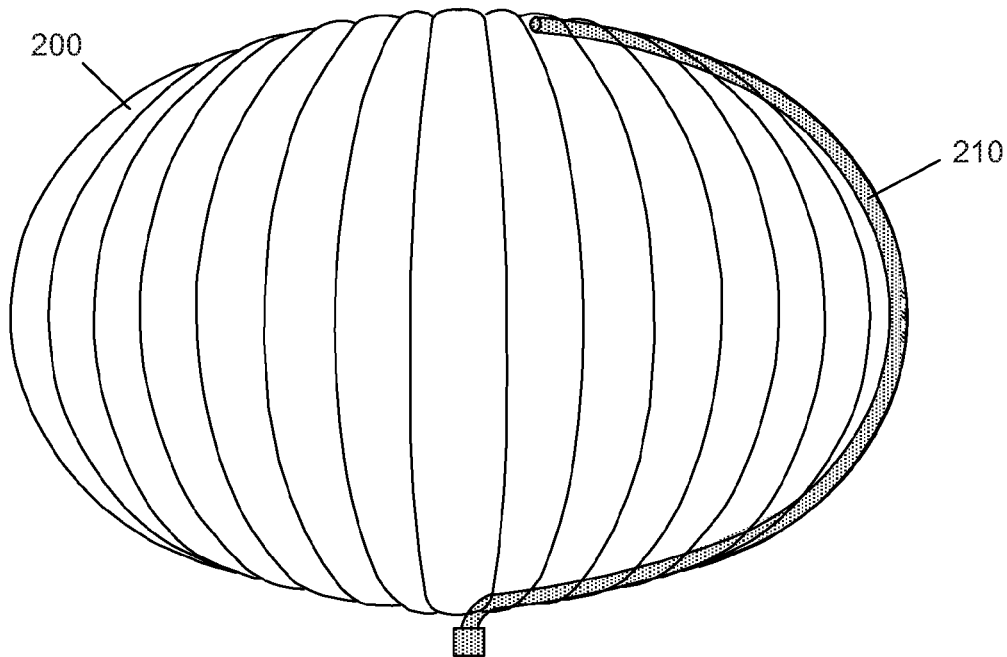

FIGS. 2A and 2B illustrate the general outline of one type of high-altitude airship 200 that can be deployed using the inventive concepts disclosed herein. As shown in FIGS. 2A and 2B, an inflation tube 210 runs from a point near the crown of the airship to a point near the base or collar of the airship. Only a portion of the tube is shown in FIG. 2A.

In FIG. 2B the airship 200 has been illustrated as transparent to show the full length of the tube 210. The inflation tube 210 allows lifting gas to be selectively introduced into the crown of the airship during initial inflation of the airship. By inflating the crown of the airship first, the airship deployment proceeds smoothly and allows the reel to continuously unroll the high-altitude airship as the crown of the airship rises out of the payload bay 120, FIG. 1D. If the high-altitude airship 200 is constructed along the lines of a pumpkin-lobed balloon as shown in FIGS. 2A and 2B, the inflation tube 210 may be integrated with one of the seams between gores of the balloon. However, other integration methods could be used, including supporting the inflation tube 210 from the crown of the airship so that the tube hangs down the center of the airship when the airship 200 is inflated. The purpose of the inflation tube 210 is to allow hydrogen gas to be introduced in such a way that the crown of the airship is the first portion to be significantly inflated, as opposed to its base (more generally, the purpose of the inflation tube is to first inflate the part of the high-altitude airship or balloon that is outermost on the drum or spindle 250, and which will be deployed first).

Figure 3A:
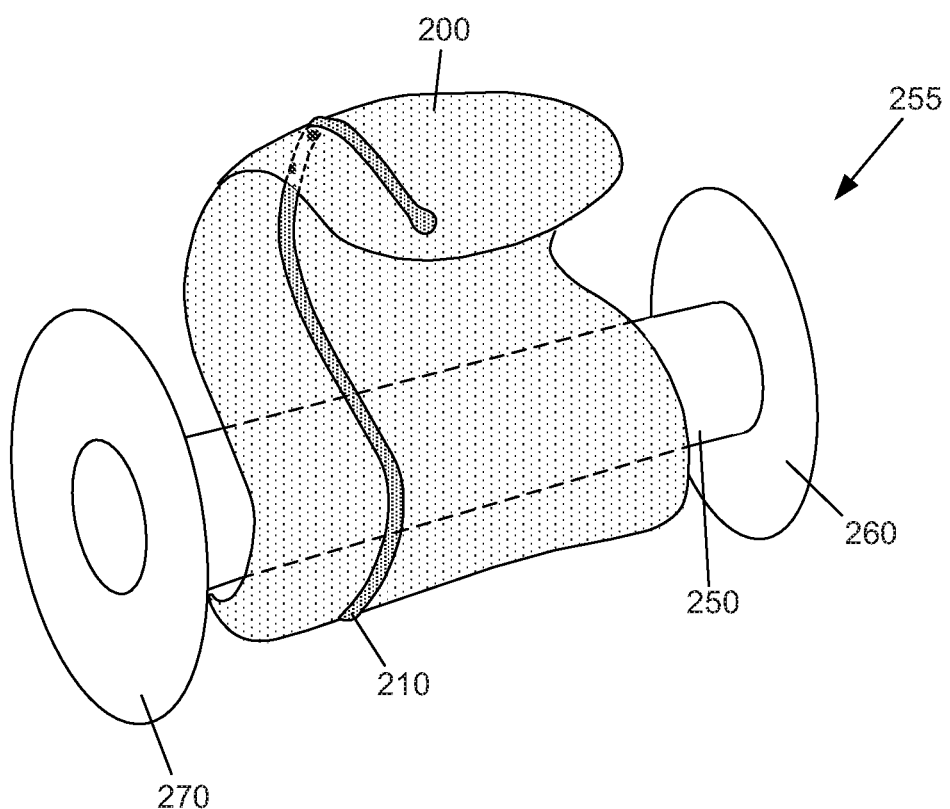
FIG. 3A-3C show a storage concept for a high-altitude airship carried within a payload bay of a cargo airship, according to one example of principles described herein.

FIG. 3A illustrates a general stowage concept for a high-altitude airship carded within the payload bay of the cargo airship 100 (or 110), in accordance with one example of the present specification. This particular example is adapted to the form of the airship 200 illustrated in FIG. 1A-1D, but may be used for certain other airship types and geometries as well. As illustrated in FIG. 3A, the hull comprising the envelope of the lifting volume of the high-altitude balloon or airship 200 is wound loosely on a reel 255. In this example, the reel 255 includes a spindle 250 between end plates 260 and 270. The reel 255 may be supported by additional equipment that is not shown and may include a variety of additional components including motors, brakes, and sensors.

The inflation tube 210 is constructed to resist crushing so that it maintains an open cross-section along its entire length when subjected to the expected compression loads associated with the hull of the high-altitude airship 200 (along with the inflation tube 210 itself) being wound on the reel 255. As the airship 200 is wound onto the reel 255, tension in the direction of winding is carefully managed to insure that compressive forces do not crush the inflation tube 210.

The inflation tube 210 is connected, through the action of a commandable valve that is part of the balloon 200, and a reversible mating apparatus, to a filling port on the reel 255. The filling port, in turn, is fluidically connected to an external supply of lifting gas. One or more of these connections includes a rotating joint (such as a slip ring joint) that allows a first half of the connector to rotate with the reel 255. The other portion of the connector is connected to the external gas supply and remains stationary.

The inflation tube 210 may include one or more diffusers on its terminal end to ensure that hydrogen gas is distributed into the crown of the balloon without damage to the balloon material by the temperature or pressure of the hydrogen. For example, if the hydrogen is taken from cryogenic storage, the hydrogen may be very cold. The diffuser allows the hydrogen to be more effectively distributed and warmed. The diffuser may include an end cap with multiple openings, multiple openings along the length of the tube, or other appropriate configuration. The diffuser may allow the hydrogen to be delivered at higher pressures for more rapid inflation of the balloon. Further, if the tube is used to extract gas from the balloon, the diffuser provides multiple openings that are less likely to be blocked.

In operation, the apparatus and structures illustrated generally in FIG. 3A allows the high-altitude airship 200 to be filled with lifting gas even while it is being unspooled from the drum or spindle 250. Specifically, after the cargo airship 100 (or 110) reaches a desired deployment and launch altitude, and is allowed to drift with the wind so that it achieves close to zero airspeed, the payload bay door or flap 120 is opened or retracted, exposing the payload bay with its high-altitude airship 200 wound on the reel 255. A small amount of lifting gas is introduced into the high-altitude airship 200 by way of the previously-noted plumbing contained in the drum or spindle 250, the filling port, the reversible mating apparatus, the commandable valve, and the inflation tube 210. This causes the crown of the high-altitude airship (or other portion that is wound outermost on the drum or spindle 250) to inflate, become buoyant, and start to pull upward and away from the reel 255. This will naturally tend to cause the drum or spindle 250 to unwind. Additional lifting gas can be introduced as already described, taking care to avoid an excessive inflation rate that could cause the hull of the high-altitude airship to rupture. A motor and brake apparatus, associated with the reel 255 is included in some examples to enhance the deployment sequence by assisting in initial deployment (through motorized turning of the drum or spindle) and also slowing the rate of deployment (braking, if necessary).

As illustrated in FIG. 3A, even in its "stowed" or "wound" configuration, a small portion of the high-altitude airship may remain substantially "unwound" on the drum or spindle 250, so as to facilitate initial inflation and the creation of a suitable "bubble of gas" that will achieve positive buoyancy (so that it floats upward and away from the drum or spindle 250).

In another example, an inflation tube or functionally similar structure is connected to a portion of the high-altitude airship that is accessible or "exposed" on the outer layer of the high-altitude airship as it is wound on the drum or spindle 250. In another example, the inflation tube is connected to a portion of the high-altitude airship that is initially not wound on the drum or spindle, and this portion of the high-altitude airship is also releasably secured to a fixture or stay on the cargo airship. For example, an equipment package of the high-altitude airship including a "fill port" with a commandable valve is releasably secured on the outer surface of the cargo airship, while the majority of the hull of the upper airship is spooled on a drum or spindle inside a cargo bay of the cargo airship or alternatively folded in a configuration to facilitate proper deployment. Upon initial inflation with lifting gas via the fill port, a "bubble" of lifting gas will form inside a portion of the hull of the high-altitude airship that is in close proximity to the fill port, and will serve to extract the remainder of the high-altitude airship from the cargo bay. Following proper inflation, the commandable valve is commanded to a closed position, the connection to the inflation tube is severed, and the high-altitude airship is released. In this example, a rotating joint is not used thereby avoiding the need to ensure that the filling tube remains "open" along its length while it is wound on the reel and spindle.

In yet another example, a long tube is connected to a fill port with a commandable valve located on an externally-accessible portion of the high-altitude airship, and this portion is allowed to lift away from the cargo airship during the inflation process. This example uses a longer filling tube, but avoids the need for a separate releasable structure securing the equipment package and fill port to the cargo airship.

As the high-altitude airship 200 is unwound from the drum or spindle 250, and inflated with lifting gas, the combined system of the cargo airship 100 (or 110) and high-altitude airship 200 becomes more buoyant (i.e., since the total mass is the same but the total lifting volume filled with lifting gas is increased), and so it tends to seek a higher altitude. The local wind field may change for this and other reasons, but the combined system tends to drift with the lateral wind (although there is a lag in responding to changes in the wind field) and airspeed tends to remain low. This has the effect of protecting the high-altitude airship 200 from damage due to high winds during deployment. When applicable, the cargo airship 100 (or 110) can be operated (maneuvered) to actively follow the winds, using its maneuvering and propulsion capability to overcome its own inertia and thereby help to minimize the local airspeed experienced by the high-altitude airship 200 during its deployment. Furthermore, in some examples, the cargo airship 100 (or 110) can actively control its own buoyancy, for example by dropping ballast, venting lifting gas or pumping lifting gas into a reservoir (thereby allowing its lifting volume to be reduced). Alternatively, propulsive forces (such as propellers or fans adapted to provide a downward force) can be utilized to counteract the increase in buoyancy. In such examples, the altitude of the combined system can be held relatively constant during the deployment sequence.

The amount of lifting gas introduced into the high-altitude airship can be metered to ensure that a proper amount of lifting gas is introduced to take the airship to its desired altitude, while guarding against over inflation. When the proper amount of lifting gas has been introduced, and the high-altitude airship is fully unspooled from the drum or spindle 250, the commandable valve is closed and the reversible mating apparatus is operated to demate the airship 200 from the mating fixture of the drum or spindle 250. The high-altitude airship then ascends from the cargo airship 100 (or 110), while the cargo airship 100 (or 110) itself descends to a lower altitude.

Figure 3B:
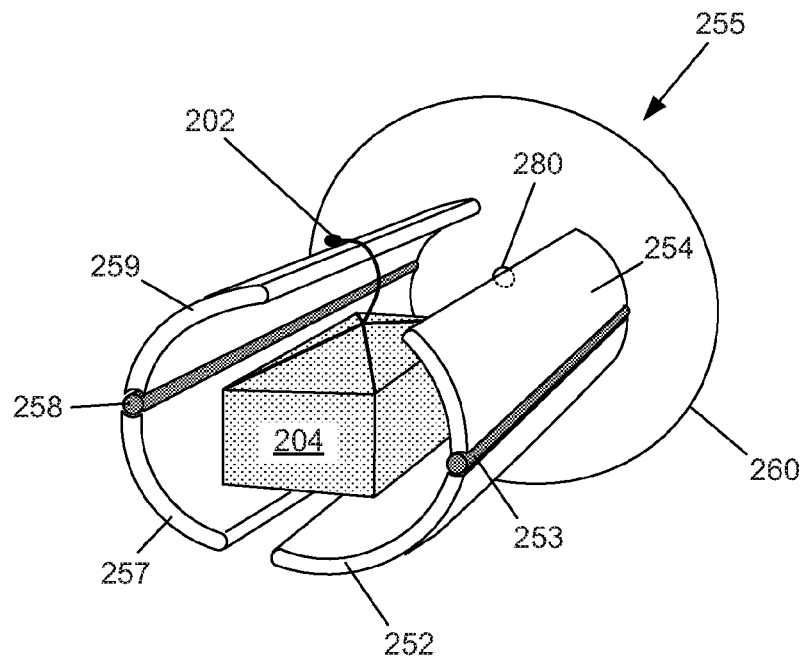
Figure 3C:
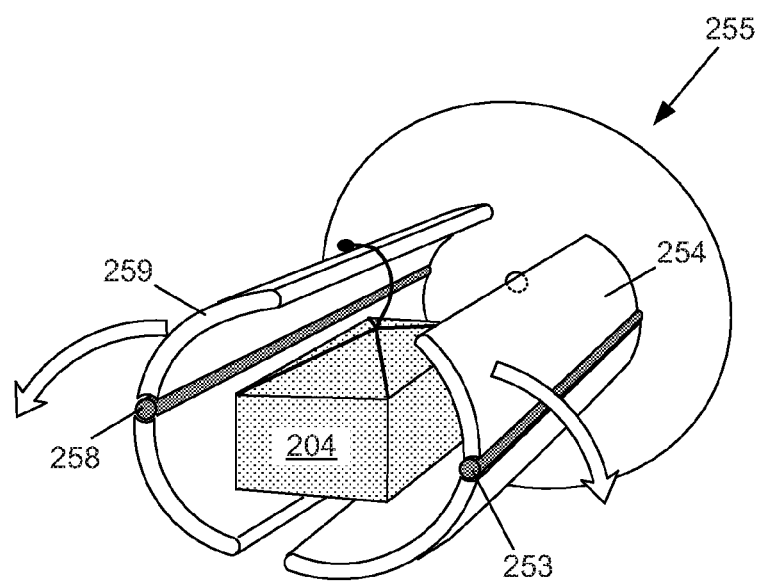

If the high-altitude airship 200 is associated with a payload, perhaps connected to the airship with shrouds so that the payload will be suspended below the airship during operation, the apparatus of FIG. 3A can be modified or adapted as illustrated in FIGS. 3B and 3C. Here, end plate 270 has been removed from the illustration for clarity (although it is present in the intended apparatus) and drum or spindle 250 has been replaced with fixed cylindrical segments 252 and 257 and movable cylindrical segments 254 and 259. The movable segments 254 and 259 are connected to the fixed segments 252 and 257 through hinge lines 253 and 258, and can open outward under the influence of remotely commandable latches, springs, or other actuators. The payload 204 is secured to the fixed cylindrical segments 252 and 257, and held within the generally cylindrical space as illustrated, by remotely commandable, reversibly latchable mounting apparatus not explicitly shown. Shroud lines 202 are illustrated schematically as extending from the payload 204 and wrapping around the fixed and movable cylindrical segments already described. Numerous turns of the shroud lines 202 on the cylindrical segments could exist, followed by the high-altitude airship itself. As noted previously, the high-altitude airship 200 comprises an inflation tube 210, commandable valve, and reversible mating apparatus which in this example is connected to a filling port 280 located axially on the end plate 260. A variety of additional components may also be included. For example, a short tube may be used to span the distance from the airship hull itself, which may be outside the generally cylindrical space bounded by the cylindrical segments 252, 254, 257 and 259, and the reversible mating apparatus connected to the filling port 280.

In operation, the high-altitude airship 200 is unwound from the apparatus illustrated in FIGS. 3A-C. However, the unwinding activity is paused when the high-altitude airship 200 is clear of the apparatus. The commandable valve is then closed. In one example, a hull integrity check can be performed at this stage and, if a breach in the hull is detected, the high-altitude airship can be vented of its lifting gas and rewound on the illustrated apparatus, and returned to the ground for repair (alternatively, if it is infeasible to re-stow the airship, it can be jettisoned and only the payload can be returned to the ground). If no fault is detected, the reversible mating apparatus is operated to demate from the filling port 280. The unwinding activity is then continued, until the shroud lines are fully extended. At this stage, the rotation of the apparatus is again halted. The movable segments 254 and 259 are commanded open and pivot on hinge lines 253 and 258, respectively, as shown in FIG. 3C. The remotely commandable latches holding the payload 204 in place are then commanded open, releasing the payload 204 and the entire high-altitude airship 200 from the cargo airship 100 (or 110).

OTHER EXAMPLES

Figure 4:
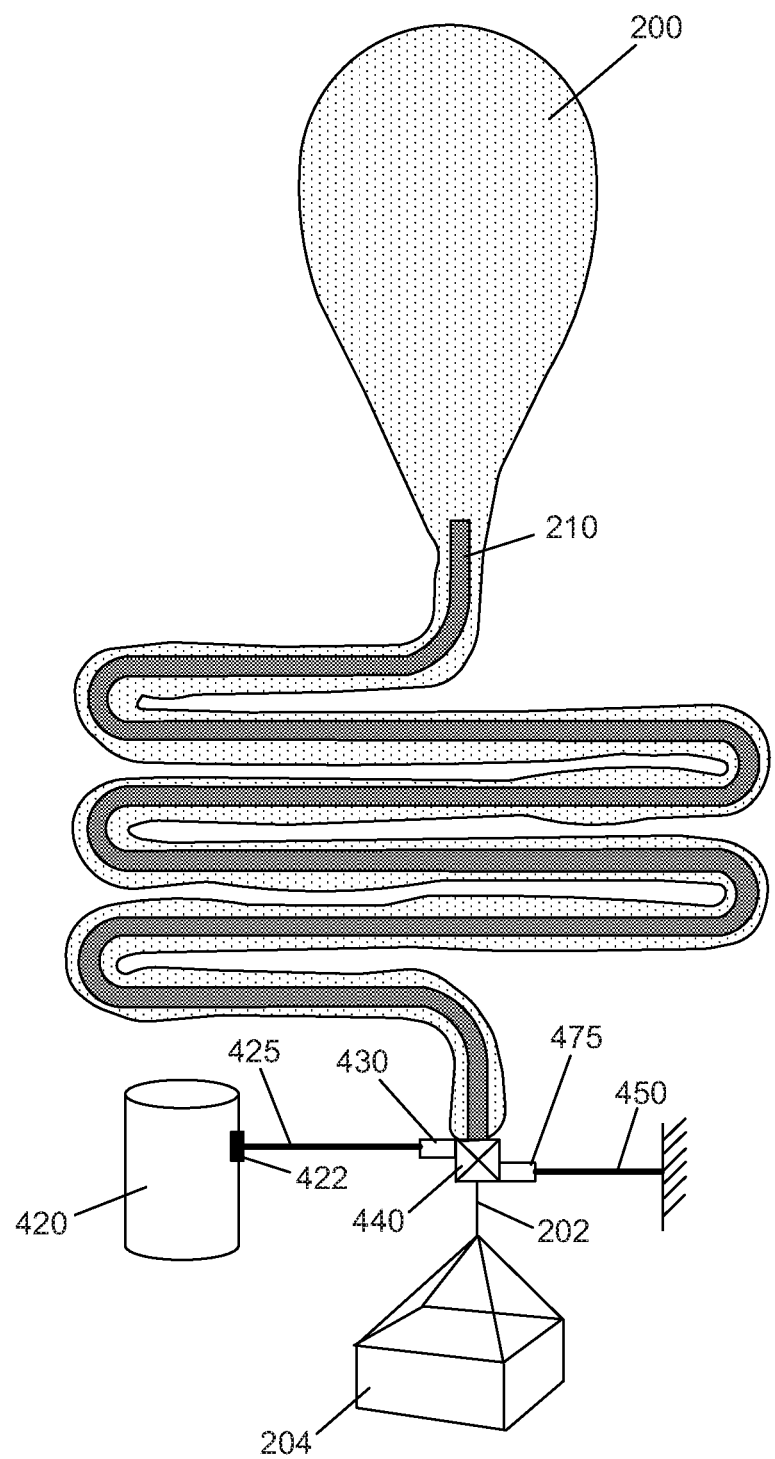
FIG. 4 is a diagram deployment of a high-altitude airship that has been folded in a payload bay of a cargo airship, according to one example of principles described herein.

In another example, instead of a rotatable reel, the high-altitude airship is folded and stowed in an accordion fashion within the payload bay of the cargo airship. FIG. 4 illustrates a partially-filled high-altitude airship at an early point in the deployment process associated with such an example. The high-altitude airship 200 is shown partially folded and partially inflated. The figure illustrates a reservoir of lifting gas 420, a remotely operable valve 422, and a gas line 425 fluidically connecting the valve 422 to a remotely operable mating apparatus 430 which is mated to a gas fill port on the collar 440 of the high-altitude airship 200. The collar 440, in turn, comprises a second remotely operable valve (not shown) connecting the gas fill port to the inflation tube 210, which was previously discussed. Also shown is a bracket 450 and remotely operable latch 475 which holds the collar of the high-altitude airship in place until the latch 475 is released. The payload 204 is attached to the collar 440 by shroud lines 202. In operation, the remotely operable valves are operated to fill the airship with a suitable amount of lifting gas from the reservoir 420. The high-altitude airship inflates and extracts (or substantially extracts) itself from the cargo bay. The remotely operable valves are closed and, in one example, a hull integrity check is performed. The remotely operable mating apparatus 430 is operated to demate from the collar of the high-altitude airship, and the remotely operable latch 475 is operated to release the high-altitude airship 200 along with its payload 204.

In another example, the high-altitude airship is secured to the top of the cargo airship rather than being stowed internally within a payload bay. In this example, if the high-altitude airship is associated with a payload, the payload may be stored in a payload bay, or it also may be secured externally to the cargo airship, and released when required.

Deployment of a Tethered Airship System

In the implementation described below, the numerical examples are approximate and intended to illustrate general principles of the inventive concept as opposed to a precise design. Further, a number of simplifying assumptions, such as ignoring temperature differences, are used in the illustrative calculations.

Consider a tethered airship system in accordance with U.S. application Ser. No. 13/159,215 comprising a lower airship, an upper airship and a tether connecting the two airships. In one example described the present specification, the upper airship and tether is initially launched from the ground, and carried as a payload of the lower airship. As one example of the principles described herein, assume that the lower airship weighs ~5000 kg, is designed to operate in an altitude range of 18 to 19 km, and comprises a maximum lifting volume of 44,700 $m^3$ in one or several ballonets that can withstand a maximum pressure difference of 2 kPa (i.e., they can be deflated, or partially inflated, or fully inflated to ambient pressure, or fully inflated to a pressure up to 2 kPa above ambient pressure). Assume the upper airship weighs ~2150 kg, is designed to operate in an altitude range of 27 to 37 km, and comprises a maximum lifting volume of 500,000 $m^3$ in a balloon that can be inflated to a maximum pressure difference of 100 Pa relative to ambient pressure. Assume that the tether weighs 600 kg.

Initially, the total weight of all systems is 7750 kg and the lower airship, considering its maximum lifting volume, can carry this total weight to an altitude in excess of 15 km. At this altitude, atmospheric density is about 0.193 $kg/m^3$ and the density of an equivalent volume of hydrogen is about 0.0015 $kg/m^3$. If this is rounded up to 0.002 $kg/m^3$, the reader will appreciate that the lifting capacity of the lower airship will be about 0.191 $kg/m^3$ and only 44,000 $m^3$ of lifting volume would be sufficient to carry 8400 kg (650 kg more than the total system weight) to 15 km. Hence the lower airship can carry the total system to 15 km with some design margin (i.e., the ballonets do not require full inflation at 15 km altitude in order to carry the total system weight).

With the system as described, the total system is in buoyant equilibrium at about 15 km altitude with most or all of the lifting volume of the lower airship operated at ambient pressure (i.e., some or all of the ballonets may be partially inflated, and pressurized sections of the hull intended to maintain a rigid aerodynamic shape have been ignored for this calculation). The lifting gas, which is at ambient pressure, could be transferred from one ballonet to another within the lower airship without affecting total system buoyancy. Similarly, some of the lifting gas could be transferred at atmospheric pressure from the ballonets of the lower airship, to the upper airship, without affecting total system buoyancy. Hence, the upper airship could be filled with a sufficient quantity of lifting gas to carry the upper airship and the full weight of the tether to the maximum design altitude of 37 km, where the upper airship would be fully inflated and would experience at internal pressure roughly 100 Pa above ambient. However, prior to release, the upper airship and lower airship are both at the pre-existing equilibrium altitude since the total lifting volume has not changed (it has only been shifted from one part of the system to another). The volume of gas, at ambient pressure at 15 km, required to carry the upper airship plus tether to that altitude is roughly $$(2150+600)/0.191 \approx 14,400 \text{ m}^3,$$

or roughly one-third of the original lifting volume of the lower airship. If carried to an altitude of 37 km, and allowed to expand to match atmospheric pressure at that altitude (420 Pa), this volume of lifting gas would expand to roughly 415,000 m$^3$. If instead, a volume of approximately 21,600 m$^3$ of lifting gas is transferred (at 15 km where pressure is nominally 12,045 Pa), the upper airship could be operated at 37 km at its full volume of 500,000 m$^3$ and full internal pressure of 520 Pa (i.e., 100 Pa above ambient).

After a transfer of 21,600 m$^3$, the lower airship has an effective lifting volume of roughly 22,400 m$^3$ or less, considering that it started with less than 44,000 m$^3$. Hence, its lifting capacity is no more than (22,400 m$^3$)*(0.191 kg/m$^3$) $\approx$4300 kg. This is less than the weight of the lower airship (5000 kg). If the upper airship is released and allowed to ascend to 37 km altitude, it will provide a buoyancy force of (500,000 m$^3$)*(0.0055 kg/m$^3$)=2750 kg; roughly the weight of the upper airship plus the tether. So the total lifting force is no greater than 6950 kg, which is less than the total system weight (7800 kg). Hence, the lower airship will not be able to maintain its altitude as the upper airship ascends— additional lifting gas is be added to the lower airship in order to increase buoyancy, and actually achieve the intended operational altitude of about 18 km. In order for the lower airship to carry its own weight ignoring the tether, at an altitude of 18 km where atmospheric density is 0.1207 kg/m$^3$ and atmospheric pressure is 7,505 Pa, and the lifting capacity of hydrogen is roughly (13/14)*0.1207~0.112 kg/m$^3$, the lower airship is to attain a lifting volume of roughly 44,600 m$^3$. This same amount of lifting gas, at the initial deployment altitude of 15 km where atmospheric pressure=12045 Pa, comprises a volume of roughly (44,600 m$^3$)*7505/12045~27,800 m$^3$. Hence, adding to the remaining complement of the lower airship (roughly 22,400 m$^3$ of lifting gas after the inflation of the upper airship), roughly 5400 m$^3$ of hydrogen gas is to be added at the ambient atmospheric pressure of 12045 Pa. This can be added from an internal reservoir carried by the lower airship (cryogenic, non-cryogenic, or chemical), or an external tanker/logistics airship adapted to provide additional lifting gas.

In the example just described, some of the need for additional lifting gas could be alleviated by utilizing the full lifting volume of the lower airship. It may also be feasible, for some examples, to tailor the initial operation of the lower airship so that it experiences a positive pressure differential (inside pressure compared to outside) at equilibrium altitude prior to the transfer of lifting gas to the upper airship. This would leave the lower airship with a slightly greater volume of lifting gas following the transfer of gas to the upper airship, thereby minimizing the need for replenishment gas from an internal reservoir or external tanker/logistics airship. However, care must be taken when performing such an operation since the tendency, upon initiating the transfer of gas, will be for the total system to rise slightly in altitude (i.e., since the lifting volume of the upper airship increases, but the lifting volume of the lower airship remains unchanged since its lifting volume is initially pressurized relative to ambient pressure). Thus, care must be taken to ensure that the design parameters of the lower airship (specifically, maximum pressure differential) are not exceeded in any of its ballonets or its lifting volume as a whole.

In one example, the lower airship is augmented with a cryogenic reservoir of lifting gas (which increases its weight), loaded with the upper airship and its associated deployment apparatus, and inflated to achieve neutral buoyancy at full ballonet inflation, but without overpressure, at an altitude below its intended operating altitude. Following the transfer of lifting gas to the upper airship, and deployment of the upper airship to a higher altitude, the lower airship replenishes its lifting volume with lifting gas from the cryogenic reservoir. The cryogenic reservoir may be retained on the lower airship for the life of the mission, or it may be jettisoned in a safe area where it will not pose a risk to life or property on the ground (e.g., an oceanic area). In an example where the cryogenic reservoir is jettisoned, the weight of the empty reservoir represents ballast which would tend to reduce the equilibrium altitude of the lower airship prior to being jettisoned (and specifically, during the transfer of lifting gas from the lower airship to the upper airship). At the lower equilibrium altitude, the ballonets at full inflation hold a larger quantity of lifting gas (i.e., a larger mass of lifting gas) than they would at a higher equilibrium altitude. Thus, after transferring a desired quantity of lifting gas to the upper airship, a greater amount of lifting gas remains in the lower airship, thereby reducing the size of the cryogenic reservoir needed to "top off" the lifting volume of the lower airship.

If a reservoir of lifting gas is available during gas transfer to, and inflation of, the upper airship, or equivalently if a tanker/logistics airship is available during this process, there could also be a transfer directly from the reservoir (or tanker/logistics airship) to the upper airship, for at least some of the required lifting gas, thereby avoiding the need to deplete and subsequently replenish the lower airship.

In another example, the transfer of lifting gas from the lower (cargo) airship to the upper airship is performed at an altitude where the total amount of lifting gas, used by both airships at their ultimate operational altitudes, can be accommodated within the lifting volume of the lower airship. For example, consider a tethered airship system as before where the lower airship weighs 5000 kg and is designed for operation at 18 km with a total lifting volume of 44,700 m$^3$, the upper airship weighs 2150 kg and is designed for operation up to 37 km with a total lifting volume of 500,000 m$^3$, and the tether weighs 700 kg. If the transfer is performed at an altitude of 10 km, ambient atmospheric pressure is approximately 26.5 kPa and the internal pressure of the lower airship can be maintained at 27.5 kPa using internal ballonets filled with atmospheric gases to an overpressure (relative to ambient) of 1 kPa. Under these conditions, all the lifting gas for both airships is compressed into a volume of approximately 25,000 m$^3$. This is substantially less than the total lifting volume of the lower airship which, as noted above, is 44,700 m$^3$. So no extra storage facilities, cryogenic or otherwise, are needed. However, the lifting capacity of hydrogen gas at this altitude, held at 1 kPa overpressure, is roughly 383 g/m$^3$. So the total lifting capacity is roughly (25,000 m$^3$)*(0.383 kg/m$^3$)$\approx$9550 kg which exceeds the total system weight by roughly 1700 kg. So the system is positively buoyant at 10 km altitude and will tend to rise, requiring the transfer to be completed quickly in order to avoid risk of rupturing the lifting ballonets of the lower airship. This risk can be mitigated by adding an additional releasable mass or ballast to the lower airship, where it is understood that the releasable mass has a density greater than air. For example, if 1850 kg of water ballast is initially carried aloft, the combined system will be neutrally buoyant at less than 10 km altitude prior to the transfer, and will be neutrally buoyant at roughly 10 km altitude after the transfer (i.e., considering the lower density of lifting gas in the upper airship versus the lower airship), and the transfer of lifting gas can be performed in a leisurely manner without undue risk. The water ballast can be released after the transfer is complete, in order to allow the tethered airship system to achieve its intended operational altitudes (i.e., in this example, 18 km for the lower airship, and up to 37 km for the upper airship). If excess water ballast is initially carried aloft, it can be "metered out" in a controllable release in order to achieve a desired equilibrium altitude for the transfer.

In one example, in lieu of some or all of the water ballast, the lower airship further comprises a detachable (releasable) unmanned air vehicle containing a pump which is adapted and plumbed to facilitate the transfer of lifting gases from the lower airship to the upper airship. The unmanned aerial vehicle represents a releasable mass which is carried aloft by the lower airship. Following the transfer, the connections to the lower airship are severed (with commandable valves having been commanded closed to avoid the unintended release of lifting gas), the unmanned air vehicle is released, and it is flown back to a selected landing or recovery site for a safe recovery. This example is particularly desirable when a pump is used to facilitate the transfer of lifting gas, but is not used subsequent to the transfer, and would therefore represent "dead weight" carried by the lower airship during its operational mission.

In order to avoid the need for ballast tanks and valves on the lower airship, which would also represent "dead weight" during the operational mission, the unmanned air vehicle can carry all the extra ballast needed by the system. The unmanned air vehicle can drop the ballast before it is itself released from the lower airship, or after said release.

The unmanned air vehicle can perform other desirable functions, such airship.

In another example, the low-altitude/cargo airship comprises a cargo bay that extends vertically through the entire airship, with doors, hatches, or openings on the upper surface and lower surface of the hull. The upper airship's deployment mechanisms, a pump to facilitate the transfer of lifting gases, and additional ballast as needed, are assembled into a detachable subsystem that can be released and jettisoned through the lower door, hatch or opening. The detachable subsystem comprises a releasable mass. Following the successful deployment of the upper airship, and after closing valves to prevent the undesired release of lifting gas, the detachable subsystem is released and jettisoned. It can be allowed to fall into the ocean or an uninhabited area with or without a parachute, or it can be adapted to deploy wings and fly back to a desired recovery site.

The upper airship of a tethered airship system may comprise multiple elements such as a buoyant element (such as a high-altitude balloon) at the high end of a tether, a parafoil, a parachute, and a docking element for a shuttle designed to move up and down the tether, with the parafoil, parachute, and docking element attached (and controlled from, as applicable) subsystems spaced apart along the tether. The tethered airship system may also comprise elements such as the aforementioned shuttle that moves up and down the tether, and elements associated with the lower airship such as tether attachment/deployment mechanisms and sheaths designed to protect other elements of the system from abrasion and wear. In some examples, all of these elements may be "stacked" in accordion fashion prior to deployment, in a generalization of the stowage concept illustrated in FIG. 4. In other examples, the upper airship, its associated parafoil, parachute, docking elements (and their attachment and control apparatus) and a portion of the tether are stowed on a rotatable spool as indicated generally in FIG. 3. As part of the deployment sequence, the lower end of the tether deployed from said rotatable spool is transferred and attached to the end of another segment of tether which is associated with the rest of the system. In still other examples, the rotatable spool used for stowing and deploying the upper airship and its associated elements is integrated with the "high-altitude" docking element for the shuttle (this docking element being the lower-most mechanical element associated with the upper airship). The docking element is in turn attached to the end of another segment of tether which is associated with the rest of the system. All attachments are made on the ground and verified prior to launch. This example avoids the engineering challenge and mission risk of making and ensuring a secure attachment between two elements during the deployment sequence.

Figure 5:
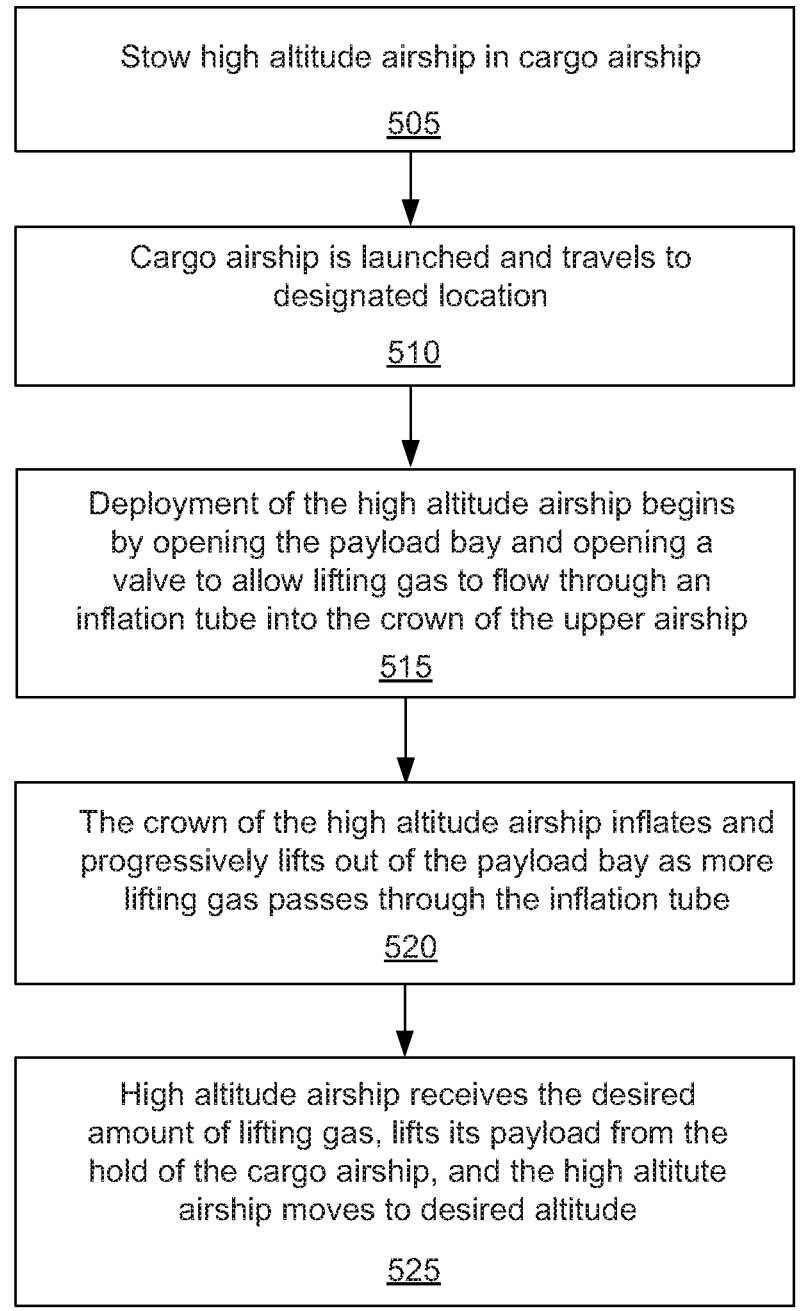
FIG. 5 is a flow chart of a method for deploying a high-altitude airship from a cargo airship, according to one example of principles described herein.

The specific details described above are merely examples. The principles described herein are not limited to the examples disclosed. The principles could be used with a wide range of airships and in a wide variety of configurations. In general, a method for launch of an airship comprises connecting a cargo airship to a deflated (or partially inflated) second airship that is not positively buoyant at the launch site, and launching the cargo airship. The cargo airship carries the second airship aloft and inflates the second airship with lifting gas carded by the cargo airship. The second airship is then released from the cargo airship. FIGS. 5 and 6 are flowcharts that describe methods for launching airships from a cargo airship.

FIG. 5 is a flow chart describing a method 500 for deploying a high-altitude airship from a cargo airship. The upper airship is stowed in the cargo airship (block 505). The cargo airship is launched and travels to a designated location (block 510). Deployment of the upper airship begins by opening the payload bay and opening a valve to allow lifting gas to flow through an inflation tube into the crown of the upper airship (block 515). The crown of the upper airship inflates and progressively lifts out of the payload bay as more lifting gas passes through the inflation tube (block 520). The upper airship receives the desired amount of lifting gas, lifts its payload from the payload bay of the cargo airship, and ascends to the desired altitude (block 525).

The method described above is merely one example and could be altered in a variety of ways. The blocks could be deleted, added, combined or reordered. For example, additional blocks could be added to describe shutting the valve after the desired amount of lifting gas has been received by the high-altitude airship or opening a reel to release the payload from the payload bay.

Figure 6A:
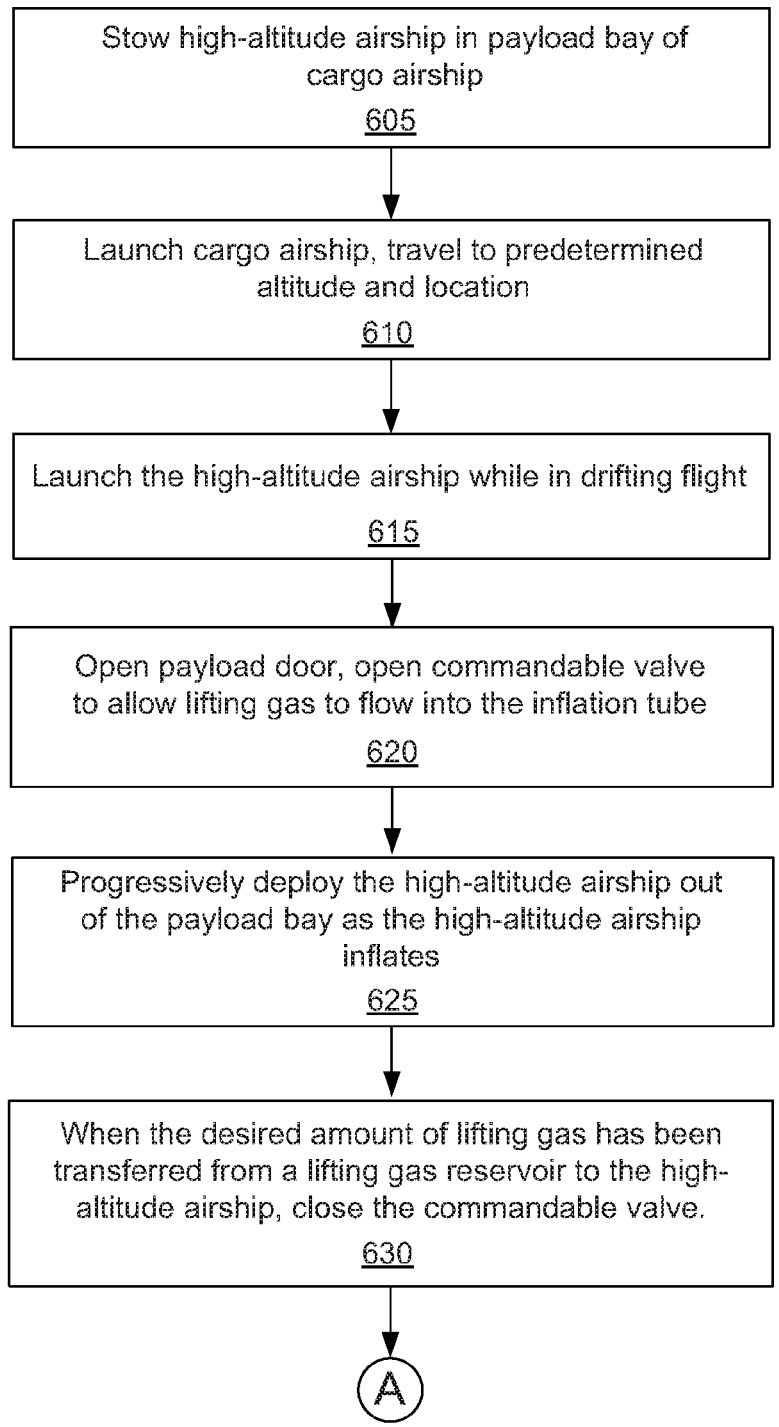
FIGS. 6A-6B show a flow chart of a method for deploying a high-altitude airship from a cargo airship, according to one example of principles described herein.
Figure 6B:
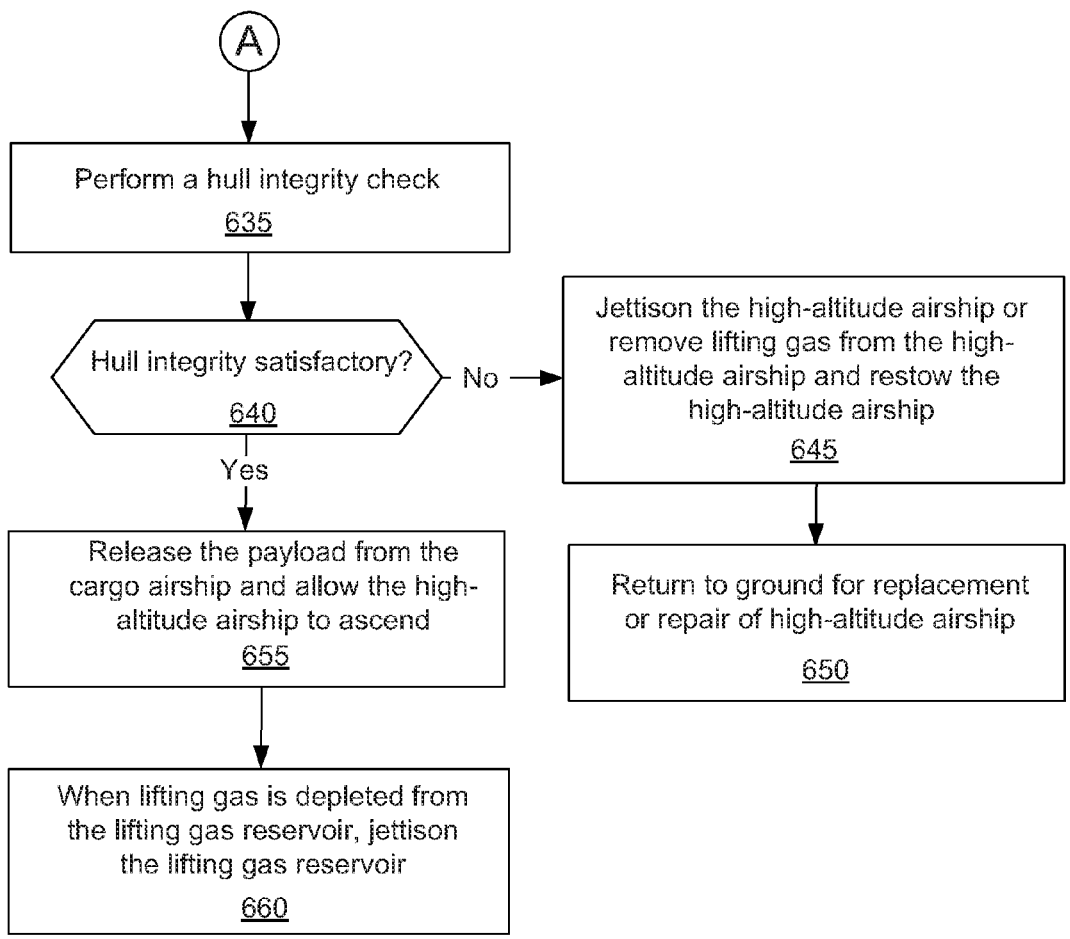

FIGS. 6A and 6B show a more detailed method 600 for deploying a high-altitude airship from a cargo airship. In this example, the high-altitude airship and its payload (if any) are stowed in a payload bay of the cargo airship (block 605). As discussed above, the hull of the high-altitude airship may be stowed in a variety of configurations, including wrapped around a reel or a number of folded configurations. The payload and other items, such as parachutes, tethers, parafoils, and other items, can be appropriately attached to the hull and stowed for deployment out of the payload door in an upper surface of the cargo ship. The high-altitude airship includes a tube that passes from a source of lifting gas through the length of the uninflated hull to the crown of the hull.

The cargo airship is launched and travels to a predetermined altitude and location (block 610). In some examples, the cargo airship may use a combination of buoyant lift, vectored thrust, ballast, aerodynamic lift, and pressure control of ballonets to maintain the desired heading, altitude, and velocity. For example, if the total mass of the cargo airship and its payload exceeds the buoyant lifting capacity of the cargo airship, the cargo airship could use vectored thrust and aerodynamic lift to increase its lifting capacity. The vectored thrust could be generated in a variety ways, including the use of directional ducted fans. Aerodynamic lift can be created through the geometry and/or angle of attack of the airship and lifting surfaces attached to the airship.

The cargo ship then transitions into drifting flight while launching the high-altitude airship (block 615). Drifting flight can include a variety of maneuvers and propulsion schemes that minimize the speed of winds on the upper airship below a predetermined threshold as it is being inflated and launched. For example, drifting flight may include controlling the cargo ship so that it travels approximately the same speed and direction as the surrounding air. Drifting flight may also include using propulsion to alter the speed or orientation of the cargo airship to maintain the desired heading. In some circumstances, drifting flight may include slight differences between the speed of the cargo airship and the surrounding air. These slight differences may be used to apply desirable aerodynamic forces on high-altitude airships.

The launch of the high-altitude airship includes opening a payload door in the upper surface of the cargo airship and opening a commandable valve to allow lifting gas to flow through the inflation tube into the crown of the high-altitude airship hull (block 620). It may also involve the use of a pump to facilitate the transfer of lifting gas. As the hull inflates the high-altitude airship is progressively deployed out of the payload bay (block 625). When the desired amount of lifting gas has been transferred from a lifting gas reservoir to the upper airship, the commandable valve is closed (block 630).

Continuing in FIG. 6B, a hull integrity check is performed (block 635). The hull integrity check may include a variety of sensors and techniques designed to determine if a hole or a rip in the hull is allowing lifting gas to escape. The hull integrity check may include sensing pressure changes in the hull, imaging the interior or exterior of the hull, detecting a change in the lifting capacity of the high-altitude airship, or other appropriate technique.

An evaluation of the hull integrity is then made (block 640). If the evaluation indicates that the hull integrity is not satisfactory, the high-altitude airship can be jettisoned or the lifting gas can be removed and the high-altitude airship restowed in the payload bay (block 645). Jettisoning the high-altitude airship may include actions such as firing a pyrotechnic cutter to cut the shroud lines that attach the hull of the airship to the payload. The hull and the lifting gas remaining inside the hull then rise rapidly away from the cargo airship. Restowing the high-altitude airship allows the airship to be returned to the ground for repair or replacement. The lifting gas can be removed using a variety of techniques, including venting the lifting gas and/or pumping the lifting gas out of the hull. Lifting gas that is pumped out of the hull can be stored in pressure tanks or returned to ballonets in the cargo ship. After the damaged hull of the upper airship has been jettisoned or restowed, the cargo airship can return to the ground for replacement or repair of the high-altitude airship (block 650).

If the hull integrity is determined to be satisfactory ("Yes") the payload can be released from the cargo airship to allow the upper airship to ascend (block 655). The high-altitude airship may be free flying or may be connected to the cargo airship by a tether. After deployment of the high-altitude airship, there may be one or more lifting gas reservoirs that are empty. These depleted lifting gas reservoirs can be jettisoned to improve the endurance and buoyancy of the cargo airship (block 660).

In sum, a two stage deployment concept that includes a robust cargo airship that can carry a high-altitude airship as a payload, travel to a desired deployment location and deploy the high-altitude airship at a suitable altitude. This enables direct insertion into difficult environments such as polar or mid-oceanic areas. By deploying the upper airship while the cargo airship is in drifting flight, winds can be minimized. This allows for easier launch and lower damage risk to the upper airship. The cargo airship can be launched in a wide variety of wind conditions and sites. This greatly increases the available launch windows for upper airships.

The preceding description has been presented merely to illustrate and describe examples of the principles described. In some of the figures the relative dimensions of components have been altered for purposes of description. This description is not intended to be exhaustive or to limit these principles to any precise form disclosed. Many modifications and variations are possible in light of the above teaching.

What is claimed is:

1. A method for launch of an unmanned second airship mechanically coupled to a cargo airship comprising:
    connecting a cargo airship to a second airship, the second airship not being positively buoyant at the launch site, the cargo airship comprising propulsive and maneuvering capabilities, the cargo airship comprising a releasable mass comprising a detachable unmanned air vehicle containing a pump to transfer lifting gas from the lifting gas reservoir to the second airship;
    launching the cargo airship, the cargo airship carrying the second airship aloft and traveling to a predetermined location and deployment altitude using the propulsive and maneuvering capabilities of the cargo airship;
    while aloft, transferring lifting gas from a first lifting volume of the cargo airship to a second lifting volume of the second airship;
    after launch and while aloft in drifting flight, performing a hull integrity check on the second airship; and
    when the hull integrity check is satisfactory, releasing the second airship from the cargo airship;
    wherein:
    the second airship is an unmanned high-altitude airship and connecting the cargo airship to the second airship comprises stowing the second airship and a payload in a payload bay of the cargo airship, said payload connected to but not within the second airship;
    transferring lifting gas comprises opening the commandable valve to allow lifting gas to flow through an inflation tube into the second airship such that the second airship inflates and progressively lifts the second airship out of the payload bay while the payload remains in the payload bay; and
    releasing the second airship comprises releasing the payload connected to the second airship from the payload bay of the cargo airship, the second airship lifting the payload from the payload bay.

2. The method of claim 1, in which the second airship has a maximum operational altitude that is at least 5 km higher than the maximum operational altitude of the cargo airship.

3. The method of claim 1, in which the second airship has a maximum operational altitude in excess of 25 km, and the cargo airship has a maximum operational altitude in excess of 18 km, and the maximum operational altitude of the high-altitude airship is at least 5 km higher than the maximum operational altitude of the cargo airship.

4. The method of claim 1, further comprising placing the cargo airship in drifting flight during inflation of the second airship.

5. The method of claim 1, in which the transfer of lifting gas is performed at an altitude where the total amount of lifting gas needed for the cargo airship to achieve its operational altitude, and for the second airship to achieve its operational altitude, can be accommodated within the first lifting volume of the cargo airship.

6. The method of claim 5, further comprising the release of a releasable mass from at least one of the cargo airship and the second airship following the transfer of lifting gas, wherein the releasable mass is not attached to either the cargo airship or high-altitude airship after release, and wherein the releasable mass comprises hardware intended to facilitate launch of the second airship.

7. The method of claim 6, in which the releasable mass is an unmanned aerial vehicle.

8. The method of claim 1, in which stowing the high-altitude airship in the payload bay of the cargo airship comprises folding the high-altitude airship in the payload bay.

9. The method of claim 1, further comprising opening a payload bay door prior to inflation of the high-altitude airship.

10. A high-altitude airship launch system comprising:
   an unmanned high-altitude airship comprising:
      a hull; and
      an inflation tube comprising a first end connected to a gas source and a second end terminating in the high-altitude airship; and
   a cargo airship comprising:
      propulsive and maneuvering capabilities to transport the high-altitude airship aloft and travel to a predetermined location;
      a lifting gas reservoir;
      a releasable mass comprising a detachable unmanned air vehicle containing a pump to transfer lifting gas from the lifting gas reservoir to the high-altitude airship; and
      a commandable valve to pass, when open, lifting gas from the lifting gas reservoir through the inflation tube into the high-altitude airship inflating the high altitude airship while in controlled flight;
      means to perform a hull integrity check on the high-altitude airship after launch of the cargo airship and while the cargo airship is aloft; and
      means to release the high-altitude airship from the cargo airship to release the high-altitude airship from the cargo airship when the hull integrity check is satisfactory.

11. The system of claim 10, in which the inflation tube further comprises a diffuser at the second end.

12. The system of claim 10, further comprising a tether connecting the high-altitude airship and the cargo airship, the tether having a length sufficient to allow a separation of at least 10 kilometers between the high-altitude airship and the cargo airship.

13. The system of claim 12, in which at least a portion of the tether is wrapped around a reel, the reel comprising a commandable motor to rotate the reel, and a brake to controllably release the tether from the reel.

14. A cargo airship comprising:
   a payload bay;
   a retractable payload door on an upper surface of the cargo airship;
   a lifting gas reservoir;
   a releasable mass that is to be released and jettisoned from the cargo airship, the releasable mass comprising a detachable unmanned air vehicle containing a pump to transfer lifting gas from a lifting gas reservoir to the high-altitude airship and at least one of:
      plumbing to transfer a lifting gas from the lifting gas reservoir to an unmanned high-altitude airship; and
      a commandable valve to control transfer of gas from the lifting gas reservoir to the unmanned high-altitude airship;
   the cargo airship further comprising:
      means to perform a hull integrity check on the unmanned high-altitude airship once the unmanned high-altitude airship is inflated with the gas and after launch of the cargo ship and while aloft; and
      means to release the unmanned high-altitude airship from the cargo airship when the hull integrity check is satisfactory.

15. A method for launch of an unmanned high-altitude airship comprising:
   launching a cargo airship to which the high-altitude airship is secured the cargo airship comprising a releasable mass comprising a detachable unmanned air vehicle containing a pump to transfer lifting gas from a lifting gas reservoir to the high-altitude airship;
   traveling to a deployment altitude away from the ground, wherein the deployment altitude is at an altitude where a total amount of lifting gas needed for both the cargo airship and the high-altitude airship accommodates for lifting gas being transferred from the cargo airship to the high-altitude airship during flight while the cargo airship maintains its altitude;
   transitioning into drifting flight;
   performing a hull integrity check on the unmanned high-altitude airship after launch of the cargo airship and high-altitude airship and while the cargo airship and high-altitude airship are aloft, and
   releasing the high-altitude airship when the hull integrity check is satisfactory wherein:
      prior to launching the cargo airship, the high-altitude airship and a payload are stowed in a payload bay of the cargo airship, said payload connected to but not within the high-altitude airship;
      transferring lifting gas comprises opening a commandable valve to allow lifting gas to flow through an inflation tube, through a diffuser, and into the high-altitude airship such that the high-altitude airship inflates and progressively lifts the high-altitude airship out of the payload bay while the payload remains in the payload bay; and
      releasing the high-altitude airship comprises releasing the payload connected to the high-altitude airship from the payload bay of the cargo airship, the high-altitude airship lifting the payload from the payload bay.

16. A high-altitude airship launch system comprising:
a high-altitude airship comprising:
  a hull; and
  an inflation tube comprising a first end connected to a gas source and a second end terminating in the high-altitude airship; and
a cargo airship comprising:
  propulsive and maneuvering capabilities to transport the high-altitude airship aloft and travel to a predetermined location;
  a lifting gas reservoir;
  a releasable mass comprising a detachable unmanned air vehicle containing a pump to transfer lifting gas from the lifting gas reservoir to the high-altitude airship; and
  a commandable valve to pass, when open, lifting gas from the lifting gas reservoir through the inflation tube into the high-altitude airship inflating the high altitude airship while in controlled flight;
  means to perform a hull integrity check on the high-altitude airship after launch of the cargo airship and while the cargo airship is aloft; and
  means to release the high-altitude airship from the cargo airship to release the high-altitude airship from the cargo airship when the hull integrity check is satisfactory;
in which the inflation tube further comprises a diffuser at the second end.

17. A high-altitude airship launch system comprising:
a high-altitude airship comprising:
  a hull; and
  an inflation tube comprising a first end connected to a gas source and a second end terminating in the high-altitude airship, the second end comprising a diffuser; and
a cargo airship comprising:
  propulsive and maneuvering capabilities to transport the high-altitude airship aloft and travel to a predetermined location;
  a lifting gas reservoir;
  a releasable mass comprising a detachable unmanned air vehicle containing a pump to transfer lifting gas from the lifting gas reservoir to the high-altitude airship; and
  a commandable valve to pass, when open, lifting gas from the lifting gas reservoir through the inflation tube into the high-altitude airship inflating the high altitude airship while in controlled flight;
  means to perform a hull integrity check on the high-altitude airship after launch of the cargo airship and while the cargo airship is aloft;
  means to release the high-altitude airship from the cargo airship to release the high-altitude airship from the cargo airship when the hull integrity check is satisfactory; and
a tether connecting the high-altitude airship and the cargo airship, the tether having a length sufficient to allow a separation of at least 10 kilometers between the high-altitude airship and the cargo airship.

\* \* \* \* \*